United States Patent [19]
Wally, Jr. et al.

[11] Patent Number: 5,574,577
[45] Date of Patent: Nov. 12, 1996

[54] METHOD AND APPARATUS FOR DIGITALLY ARCHIVING ANALOG IMAGES

[75] Inventors: Joseph H. Wally, Jr., Overland Park; John G. Voeller, Lenexa, both of Kans.

[73] Assignee: Black & Veatch Architects, Inc., Kansas City, Mo.

[21] Appl. No.: 225,656

[22] Filed: Apr. 11, 1994

[51] Int. Cl.⁶ .............................. H04N 1/00; H04N 1/04; H04N 9/47; G03B 27/00
[52] U.S. Cl. .......................... 358/487; 358/403; 355/18; 355/55; 348/108; 348/112; 356/444
[58] Field of Search .................... 358/487, 403; 355/18, 55; 348/112, 108, 79, 96; 250/570, 363.02; 356/404, 444; 382/128; 364/413.13; 378/12, 62, 146, 210, 4, 20, 181; 346/101, 108, 122

[56] References Cited

U.S. PATENT DOCUMENTS

| | | | |
|---|---|---|---|
| D. 338,903 | 8/1993 | Iimura | D16/225 |
| T945,006 | 4/1976 | Speck et al. | 348/79 |
| 4,032,784 | 6/1977 | Rich | 378/108 |
| 4,045,772 | 8/1977 | Bouton et al. | 348/79 |
| 4,574,318 | 3/1986 | Dayton et al. | 358/483 |
| 4,757,374 | 7/1988 | Ramsay et al. | 355/40 |
| 4,789,880 | 12/1988 | Mori et al. | 355/55 |
| 4,807,041 | 2/1989 | Kishi et al. | 348/112 |
| 4,910,601 | 3/1990 | Gerlach | 358/474 |
| 5,153,638 | 10/1992 | Sakakibara | 355/55 |
| 5,241,472 | 8/1993 | Gur et al. | 364/413.13 |
| 5,331,435 | 7/1994 | Scott | 358/479 |

Primary Examiner—Kim Yen Vu
Assistant Examiner—Kimberly A. Williams
Attorney, Agent, or Firm—Hovey, Williams, Timmons & Collins

[57] ABSTRACT

An apparatus for digitally archiving analog film images includes a support surface on which an analog film image may be supported, and a digitizer that is spaced from the support surface in a direction defining a Z axis perpendicular to the support surface. A light transilluminates the film image and projects it toward the digitizer through an objective lens which focuses the image. The positions of the digitizer and the lens along the Z axis are adjustable so that the size of the image projected onto the digitizing means can be varied. For example, it is possible to move the digitizer and objective lens between a range of enlarging positions in which the lens is closer to the film image than to the digitizer, and a range of reducing positions in which the lens is further from the film image than from the digitizer so that the film image may be either enlarged, reduced or reproduced at the same size before being sensed and converted into digital data.

16 Claims, 6 Drawing Sheets

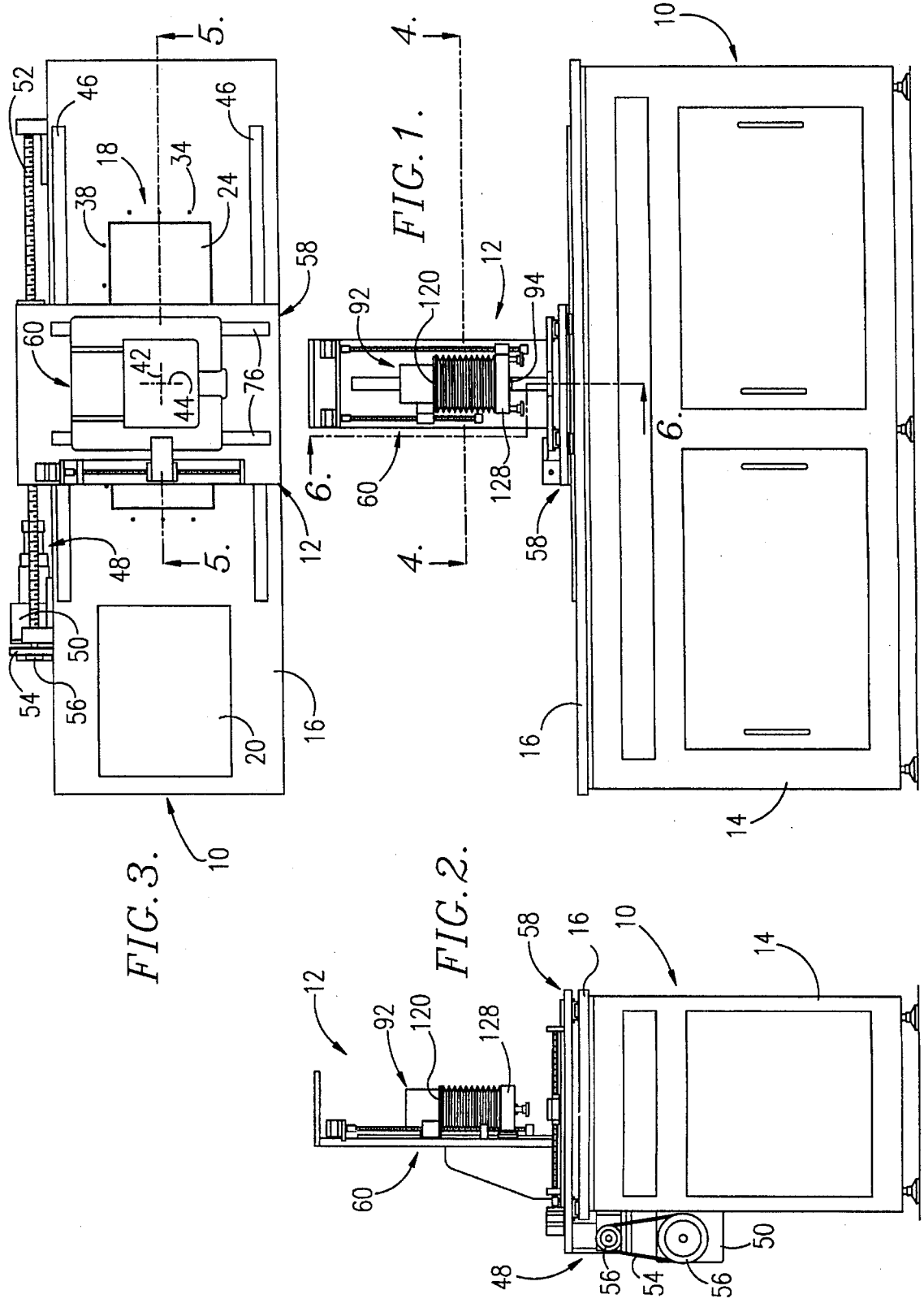

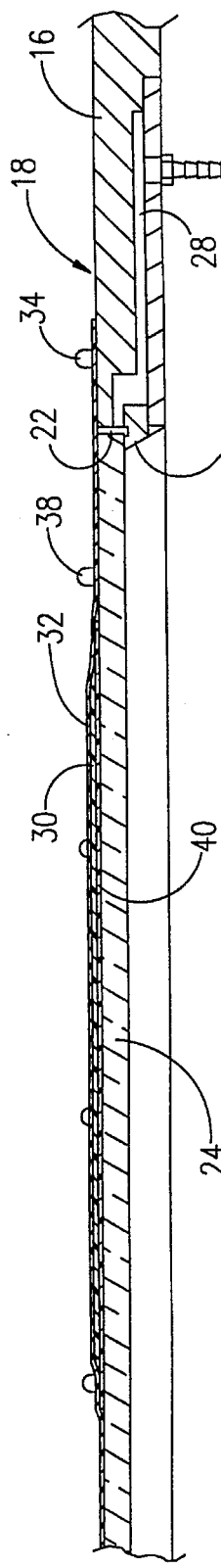
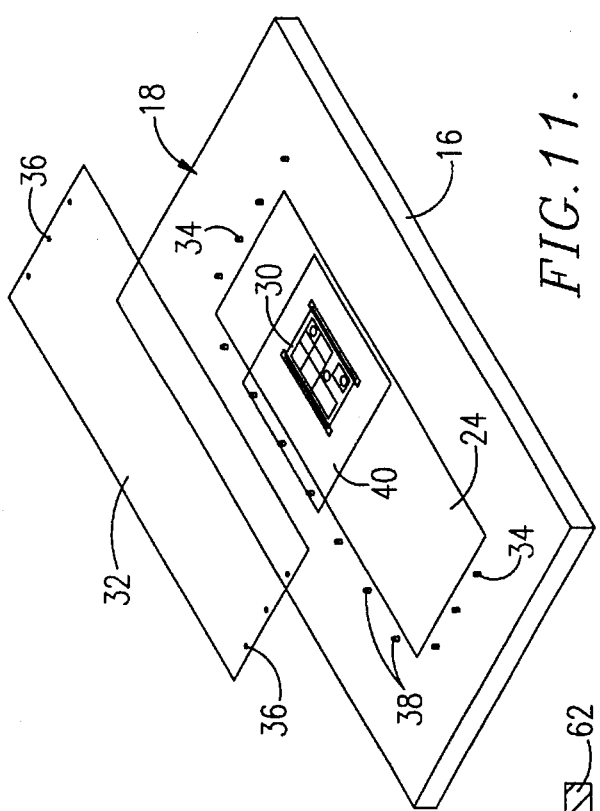
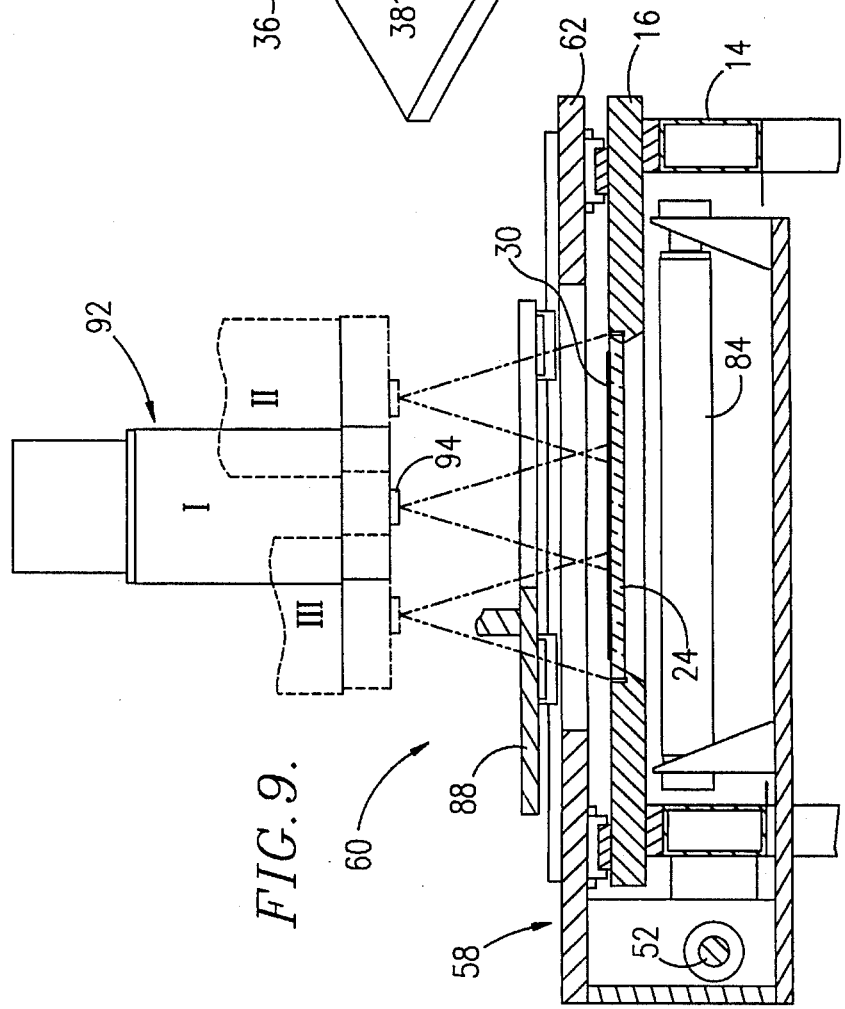

METHOD AND APPARATUS FOR DIGITALLY ARCHIVING ANALOG IMAGES

BACKGROUND OF THE INVENTION

1. Field of the Invention

The present invention relates generally to the art of digital scanning, and more particularly, to an apparatus for digitally archiving analog images from film negatives and positives which are projected onto the scanner by transillumination of the film.

2. Discussion of the Prior Art

The extent of the World's knowledge as expressed in drawings and text is significant. The problems of storing, maintaining and then finding documentation in a timely fashion have been addressed, but even near-perfection in archiving techniques is yet to be obtained. Drawings which were created by hand in the last century have been ravaged by discoloration, wear, dirt, smudging, tearing and taping, and many have been folded, carelessly used, or stored in a debilitating environment.

Further, an amazing percentage of "originals" are not true originals. Second or third generation copies have become de facto originals, with each succeeding copy representing a poorer rendition of its parent. Many of these pseudo-originals are diazo sepias on paper or mylar, and as diazo dyes are transient and impermanent, the images fade and the changes made to those drawings, usually in pencil, are so different than the sepia images themselves that the combination is difficult or impossible to copy again, even when using the images for contact prints.

It was because of the foregoing problems with traditional archiving techniques that camera/projectors were introduced in the industry. Such camera/projectors utilize film sizes of 105 mm (Nominal 4×6 inches), 8.5×11 inches with a 7.25× 9.5 inch image, or a nominal 11×17 inch size, to preserve the original image.

Particular devices which brought the industry some startling restorative effects are described in a long list of patents awarded this same inventor, of which U.S. Pat. Nos. 3,639,054 and 3,762,816 are typical. These devices combine front and back lighting of an original with superior flat field lenses, and employ hybrid chemistry in a combination with selected film emulsions to retain lines beyond the range of recovery of conventional scanning devices, even when manual intervention techniques are employed.

More importantly, conventional filming methods achieve restoration automatically, without human intervention or editing, and in seconds instead of hours. These known methods drop out discoloration and many of the artifacts, such as tape, introduced into the original drawing by aging and misuse, and they reduce a wide variance of line intensity to a common black and white denominator.

The same problems inherent in archiving original drawings prevent computer technology from bearing on the problems of warehousing and finding pertinent documentation. Digital paper scanning seemed an obvious approach and has been quite successful with small originals and originals having good images. However, most engineering drawings are not small and many have images whose quality ranges from indifferent to impossible.

Further, conventional paper scanners for large drawings have several limitations. They almost invariably have optical systems which use multiple side-by-side objective lenses, with each capturing only a part of the total image as the scanner passes over the original. Such tandem optics present an alignment problem, and distortion is inevitable.

In addition, digital paper scanners which address the originals themselves require multiple test passes, intuitive manual thresholding and close attention of the operator for minutes or hours. In bad cases, restoration can never be achieved comparably to the results which can be obtained in a camera designed for archiving the original in an analog format on film, and the camera does the job in seconds.

During the last decade it has been possible to achieve image enhancement photographically by making film negative miniatures (not microfilm) and then projecting back to full size on photo sensitive media with point source light to capture all the sharp detail found in the negative in a form which could be utilized by a conventional paper scanner. This conventional method provides many advantages over scanning the original drawing directly. For example, when a drawing is reduced onto miniaturized film, the rapid aging inherent with paper copies is arrested by the archival film at the same time that the film enhances the stored analog image. In addition, the film represents a permanent analog image that may be archived for later reference, even if it is not scanned immediately.

In contrast to the use of this known method, if the original drawing was digitized directly, the data would represent the analog image at the time of the scan, but the original would continue to deteriorate. Thus, the original would not be preserved for use if it was later necessary to scan the analog image, e.g. upon the development of improved digital scanning technology.

Another advantage of archiving drawings on film resides in the enhancement provided by the photographic process. For example, by suppressing artifacts and debris that have collected on the original drawing, film images have less information to be detected during scanning. Thus, compression of the digital data obtained from a scan of a blow-back print of the film image is easier to achieve and requires less storage than would be required otherwise. A drawing which requires 2 megabytes of storage in a conventional paper scanner may easily be retained and improved in 300 kilobytes of storage when the image is first transferred to film and then blown back to original size before being scanned.

Digital film scanners are available which provide advantages over paper scanners primarily as a result of the enhancements obtained in making the analog film image from the original drawing, as discussed above. For example, by transferring the image to film prior to scanning, the need for functions such as spatial filtering, edge sharpening, edge smoothing, contrast enhancement, thresholding, adaptive software thresholding, warping/rubber sheeting, frequency domain analysis and others is frequently obviated.

However, drawbacks to conventional film scanners do exist. For example, when drawings are reduced to extremely small film sizes, such as 35 mm aperture cards or the like, the image deteriorates due to the degree of reduction and is not capable of being returned to actual size without suffering in quality. Thus, even if the film image is scanned and enlarged through the use of software, the resolution of the image is poor.

Generally, the quality in a reduced image is directly related to the degree of reduction used; the more modest the reduction, the better the quality. This axiom does not apply where the degree of reduction is between 0 and about 4× smaller than the original, where the quality remains the same without adverse effect. Examples of conventional film sizes used in archiving drawings include 35 mm, which requires reductions of up to 36× the original size; 105 mm, which requires reductions up to 10× or 11×; 8.5×11 inches, which requires reductions of up to 10×; and 10 inch roll film, which requires reductions up to only 4× to 5×.

An example of a flow camera for producing film images on 10 inch roll film at a limited reduction factor of about 4× to 5× illustrated in U.S. application Ser. No. 08/125,444, filed Mar. 2, 1993, which is incorporated herein by this reference. This flow camera is particularly suitable for use in producing film images for conversion into digital format because, as mentioned, no degradation in image quality occurs at reductions of up to about 4×. Thus, all of the enhancements obtained through the use of photographic archiving are realized without any of the adverse effects experienced when making reductions of greater than about 4×.

Conventional film scanners render a resolution that is adjustable up to a defined maximum, e.g. 1200 to 2400 dots per inch (dpi), wherein the maximum value is dependent upon the scanner used and the amount of magnification or reduction of the film image projected onto the scanner. Once the resolution is selected, and the digital data representative of the image is stored, magnification of the image data is restricted by the number of dpi at which the image is captured. For example, an image captured at 1200 dpi that is enlarged by a factor of 4 will have a resolution of 300 dpi. If the image is enlarged by a factor of 10, the resolution of the enlargement will be only 120 dpi.

If a scanner is designed for use with 105 mm film bearing images reduced 10× relative to the original drawings, it may be constructed to scan the film using a resolution that will deliver the necessary clarity at the original size of the drawing. However, this same device may not provide enough resolution to permit proper enlargement of an image reduced by substantially more than 10× on the film, and will retain more data than is necessary to permit enlargement of an image reduced less than 10× on the film. Because the amount of reduction typically varies depending upon the size of the original drawing and the film size onto which it is being transferred, a conventional device designed for use with any one size of film will not provide consistent resolution "at the original" when used with other film sizes.

OBJECTS AND SUMMARY OF THE INVENTION

It is an object of the subject invention to bring the advantages of analog film images to the digital world by providing an apparatus for scanning film within which the images have already been enhanced. The effect of so doing is to eliminate most of the post-scan cleanup common with full size scanning directly from original drawings.

Another object of the invention is to overcome the problems encountered with the use of conventional film scanning devices, and to provide a digital archiving apparatus which enables analog film images to be enlarged or reduced if necessary before being digitized so that it is possible to control the resolution of the digitized data to compensate for size reductions made when an original document or drawing is initially transferred to the film. Thus, the apparatus is designed to accommodate a wide range of miniature film sizes between microfilm and full size films, enlarging each to the necessary degree before scanning so that the image quality obtained by the scanner is essentially the same regardless of the original degree of reduction used for the film.

Yet another object of the invention is to provide an archiving apparatus that enables digital data representative of a film image to be displayed unedited, or manipulated or compressed for storage. The apparatus is particularly suited for use with a flow camera of the type disclosed in U.S. Serial No. 08/125,444, described above, and permits all of the detail of the original drawing to be captured without requiring the production of a full size print of the image after filming and prior to scanning.

In accordance with these and other objects of the invention evident from the following description of a preferred embodiment, an apparatus for digitally archiving analog film images comprises a digitizing means for sensing a linear analog image and converting the linear image into digital data, and a support means for supporting an analog film image within a plane defined by perpendicular X and Y axes, wherein the film image is spaced from the digitizing means in a direction defining a Z axis perpendicular to the X and Y axes. A lighting means is provided for transilluminating the film image and projecting the image toward the digitizing means through an objective lens means which focuses the projected analog image at the digitizing means.

The digitizing means is supported on a mounting means with the length of the linear analog image sensed by the digitizing means extending in a direction parallel to the Y axis so that as the digitizing means is moved along the X axis, it sequentially senses and converts a plurality of linear images into digital data representing an area format. The apparatus also includes a Z-axis drive means for moving the mounting means relative to the film image in either direction along the Z axis so that the size of the image projected onto the digitizing means can be varied.

By providing this construction, along with a means for moving the objective lens means along the Z axis relative to the mounting means, it is possible to move the digitizing means and objective lens means between a range of enlarging positions in which the objective lens means is closer to the film image than to the digitizing means, and a range of reducing positions in which the objective lens means is further from the film image than from the digitizing means. Thus, the film image may be either enlarged or reduced before being sensed and converted into digital data.

Numerous advantages are realized by using an apparatus constructed in accordance with the present invention. For example, by enabling relative movement of the digitizing means and lens relative to the image, it is possible to enlarge the image projected onto the digitizing means by a variable amount before the image is converted into digital data. Thus, the clarity of the image, or dpi resolution of the resulting scanned image, may be adjusted to compensate for any reduction of the original drawing that was made when transferring the original image to film.

In addition, the apparatus can actually reduce the size of the film image projected onto the digitizing means before scanning to accommodate the resolution of the digitizing means or to increase the effective resolution. Thus, the apparatus changes the magnification of the image optically before it is converted into digital data.

BRIEF DESCRIPTION OF THE DRAWING FIGURES

A preferred embodiment of an apparatus for digitally archiving analog images constructed in accordance with the present invention is described in detail below with reference to the attached drawing figures, wherein:

FIG. 1 is a front elevational view of the apparatus;

FIG. 2 is a side elevational view of the apparatus;

FIG. 3 is a top plan view of the apparatus;

FIG. 8 is a sectional view along line 8—8 of FIG. 5, illustrating a digitizer mount of the apparatus;

FIG. 9 is a fragmentary schematic view similar to FIG. 6, illustrating three sequential positions to which the tower assembly is moved during scanning of a single film image supported on the table;

FIG. 10 is a fragmentary sectional view taken along line 5—5 of FIG. 3, illustrating the details of a hold-down assembly of the apparatus;

FIG. 11 is a perspective view of the hold-down assembly, illustrating the manner of placement of a film image on the apparatus.

DETAILED DESCRIPTION OF THE PREFERRED EMBODIMENT

Figure 12:
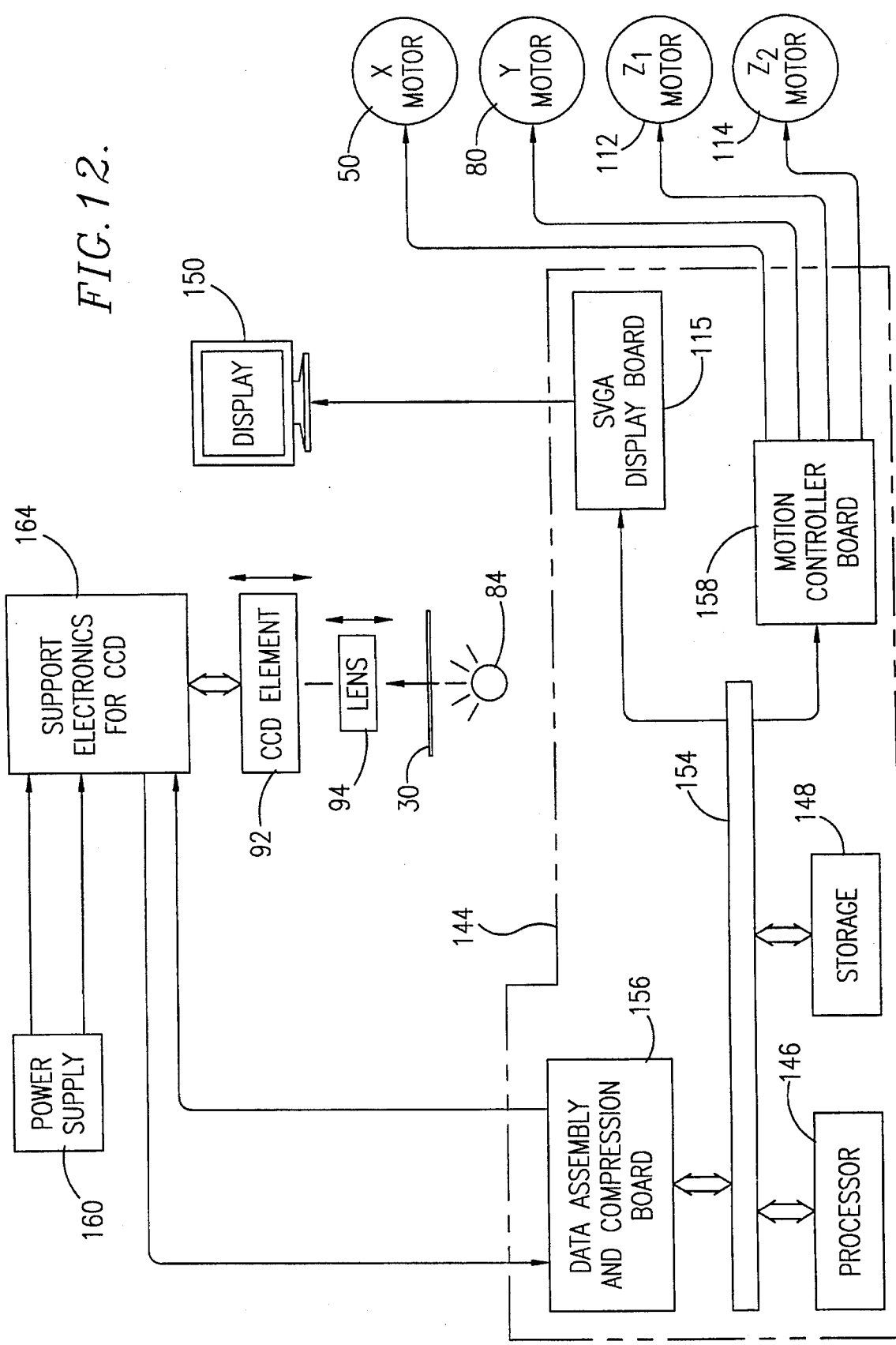
FIG. 12 is a schematic view of the apparatus, illustrating a control system of the apparatus.

A digital archiving apparatus constructed in accordance with the preferred embodiment is illustrated in FIG. 1, and broadly includes an upstanding table 10, and a carriage assembly 12 supported on the table. As described below, and as shown in FIG. 12, the apparatus also includes a control system for controlling operation of the apparatus.

The base includes a frame 14 for supporting the apparatus, and a generally flat, horizontal table top 16. The frame is open beneath the table top for receipt of various components of the apparatus, and includes doors which allow access to the open area.

Figure 5:
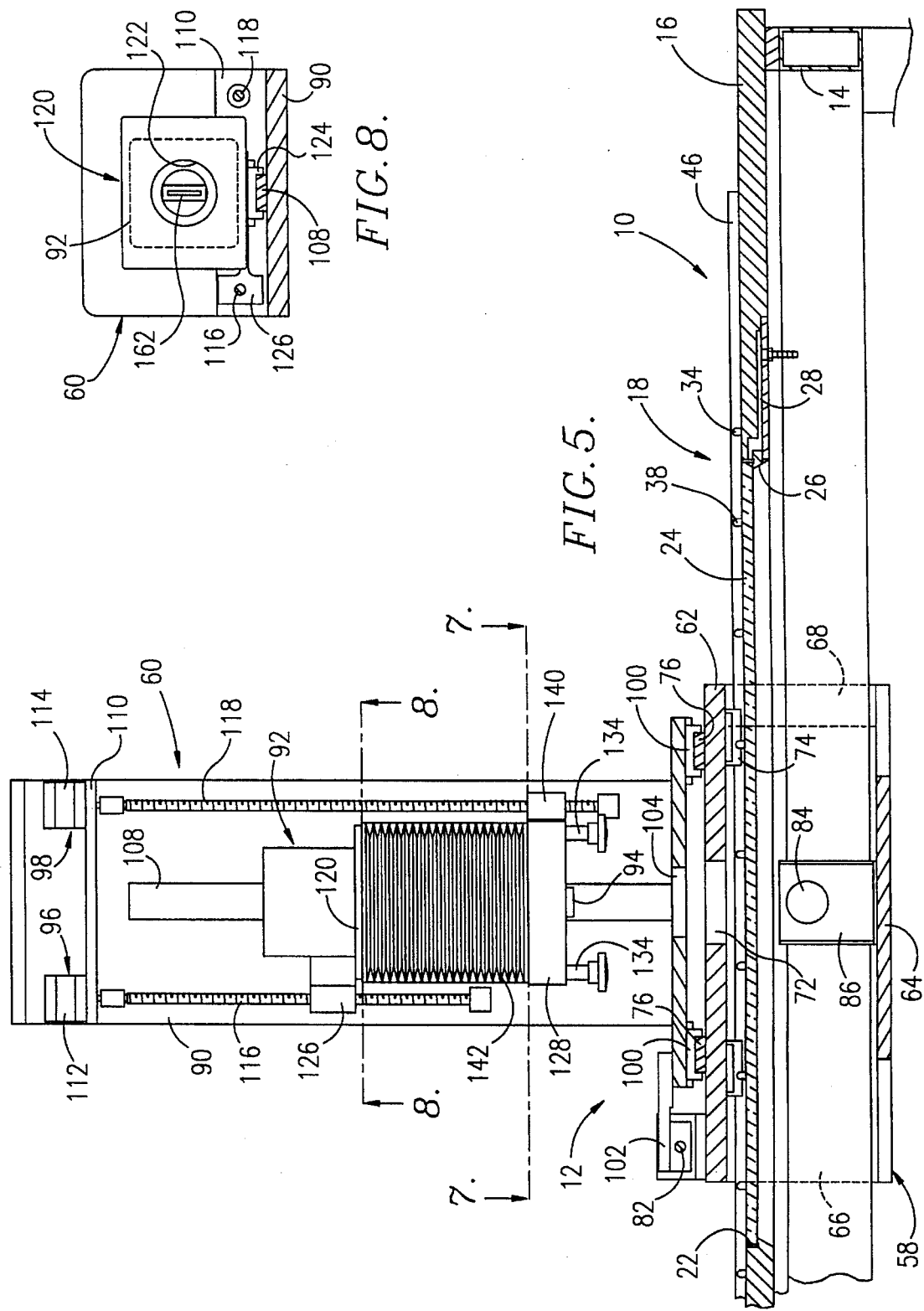
FIG. 5 is a sectional view taken along line 5—5 of FIG. 3, illustrating various features of a table of the apparatus, as well as additional elements of the carriage assembly.

The table top 16 is shown in FIG. 3, and includes a hold-down assembly 18 and a conventional light table 20. The hold-down assembly is shown in FIG. 5, and includes a rectangular hole 22 in the table top within which a transparent plate 24 of glass or the like is supported. Preferably, the plate is at least 10×28 inches in size to accommodate the desired range of film sizes used in the industry.

As illustrated in FIG. 10, the hole 22 in the table top 16 is sized slightly larger than the glass plate 24 to define a small gap or space between the plate and the table top around the perimeter of the plate. A support shelf 26 extends around the lower edge of the hole 22, and is of a size slightly smaller than the glass plate 24 so that the plate is supported within the hole 22. Preferably, the upper surface of the glass plate 24 is substantially flush with the upper surface of the table top, and defines a support surface on which a film image is positioned during scanning.

The area of contact between the glass plate 24 and the support shelf 26 provides an air-tight seal, and an air passageway 28 is provided between the gap and a conventional vacuum source so that when the vacuum source is activated, air is drawn from the gap surrounding the glass plate.

As shown in FIG. 11, a film 30 bearing an image may be placed on the support surface, and then covered by a transparent sheet 32 of mylar or other suitable material which extends over the area of the plate 24 beyond the edges of the gap. Thereafter, upon the application of a vacuum to the passageway 28, air is drawn from the gap, pulling the cover against the plate and holding the film firmly in place.

Preferably, a set of three pins 34 are provided at each lateral end of the hole 22, and the cover sheet 32 is provided with corresponding holes 36. By providing this construction, proper positioning of the cover sheet on the pins 34 insures that the gap is covered and will properly evacuate upon activation of the vacuum source.

Registration pins 38 are also provided on the table top, and extend along the rear edge of the hole 22. These pins are adapted for use in registering two or more film images on the transparent plate so that they may be scanned sequentially, one after the other, to generate a single digital composite data image. When two images are to be scanned in this manner, each image is positioned on a separate substrate 40 of mylar or the like having holes spaced from one another by the same distance as the pins 38, and are registered with the other image. This operation is typically carried out manually on the light table 20. Thereafter, each of the individually mounted films are positioned in turn on the plate 24 with the holes of the substrates 40 received on the pins 38, and with the cover sheet 32 placed over the film and drawn against the plate 24, so that the films are in registration with one another during scanning of each.

Turning to FIG. 3, the support surface of the glass plate 24 presents a horizontal plane defined by perpendicular X and Y axes, designated by dashed lines 42 and 44, and the film is supported parallel to this plane. For purposes of describing the apparatus further, reference will be made to these axes, as well as to a Z axis extending in a vertical direction perpendicular to the X and Y axes.

A pair of guide rails 46 extend along the front and rear edges of the table top in a direction parallel to the X axis, and beyond the lateral edges of the plate 24 by a distance sufficient to permit movement of the carriage assembly 12 across the width of the plate. The guide rails 46 are adapted to support the carriage assembly for movement relative to the table top along the X axis.

An X-axis drive means 48 is supported on the rear side of the table 10 for moving the carriage assembly 12 relative to the film image in either direction along the X axis. The drive means 48 includes a servo motor 50 having an output shaft connected to a rotatable drive screw 52 through a belt 54 and pulleys 56, shown in FIG. 2. The motor 50 is selected to provide accurate positioning and uniform movement of the carriage assembly 12 relative to the film image.

Figure 6:
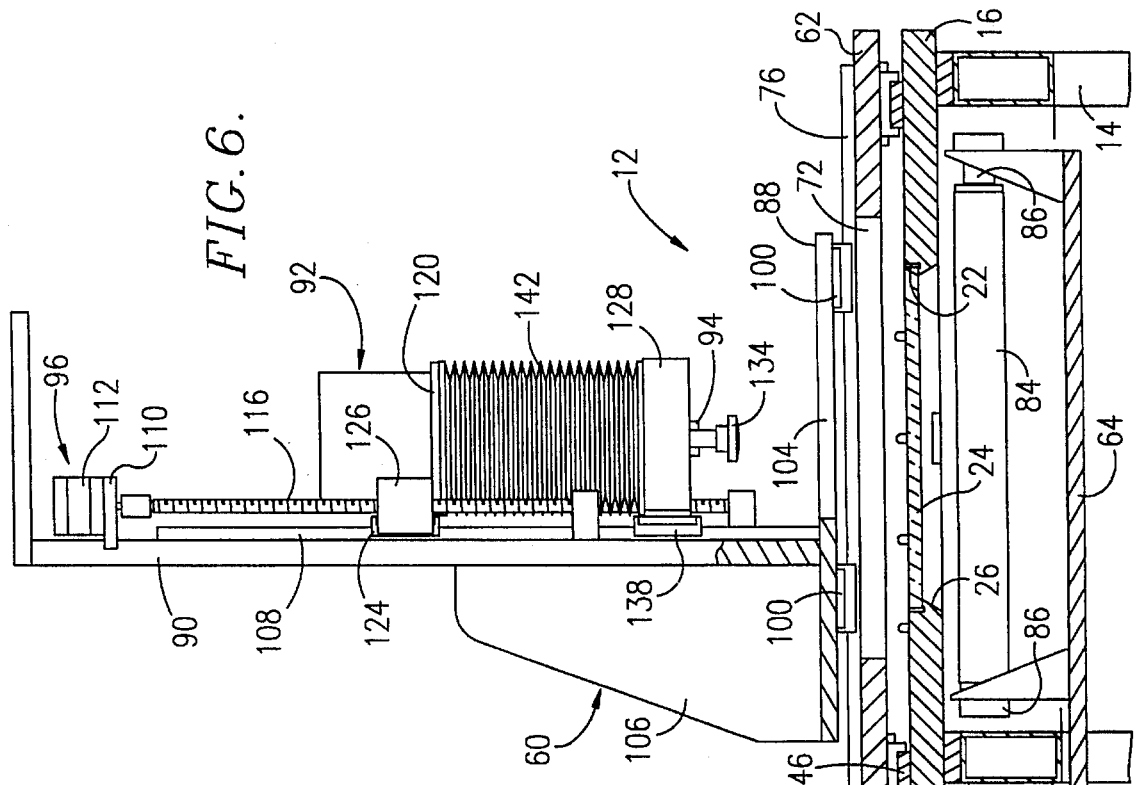
FIG. 6 is a sectional view along line 6—6 of FIG. 1, illustrating a tower assembly of the apparatus.

The carriage assembly is illustrated in FIG. 6, and includes a base carriage 58 and a tower assembly 60. As shown in FIGS. 6 or 9, the base carriage is of a generally C-shaped construction, including a rectangular upper plate 62, a lower plate 64 extending in a plane parallel with the upper plate, and a rear wall 66 connecting the plates 62, 64 together. The rear wall of the base carriage includes a side wall 68 at one end on which a follower 70 is supported. The follower is a threaded collar that is fixed relative to the carriage so that as the X-axis drive screw 52 rotates, the carriage assembly 12 is moved along the X axis.

Figure 4:
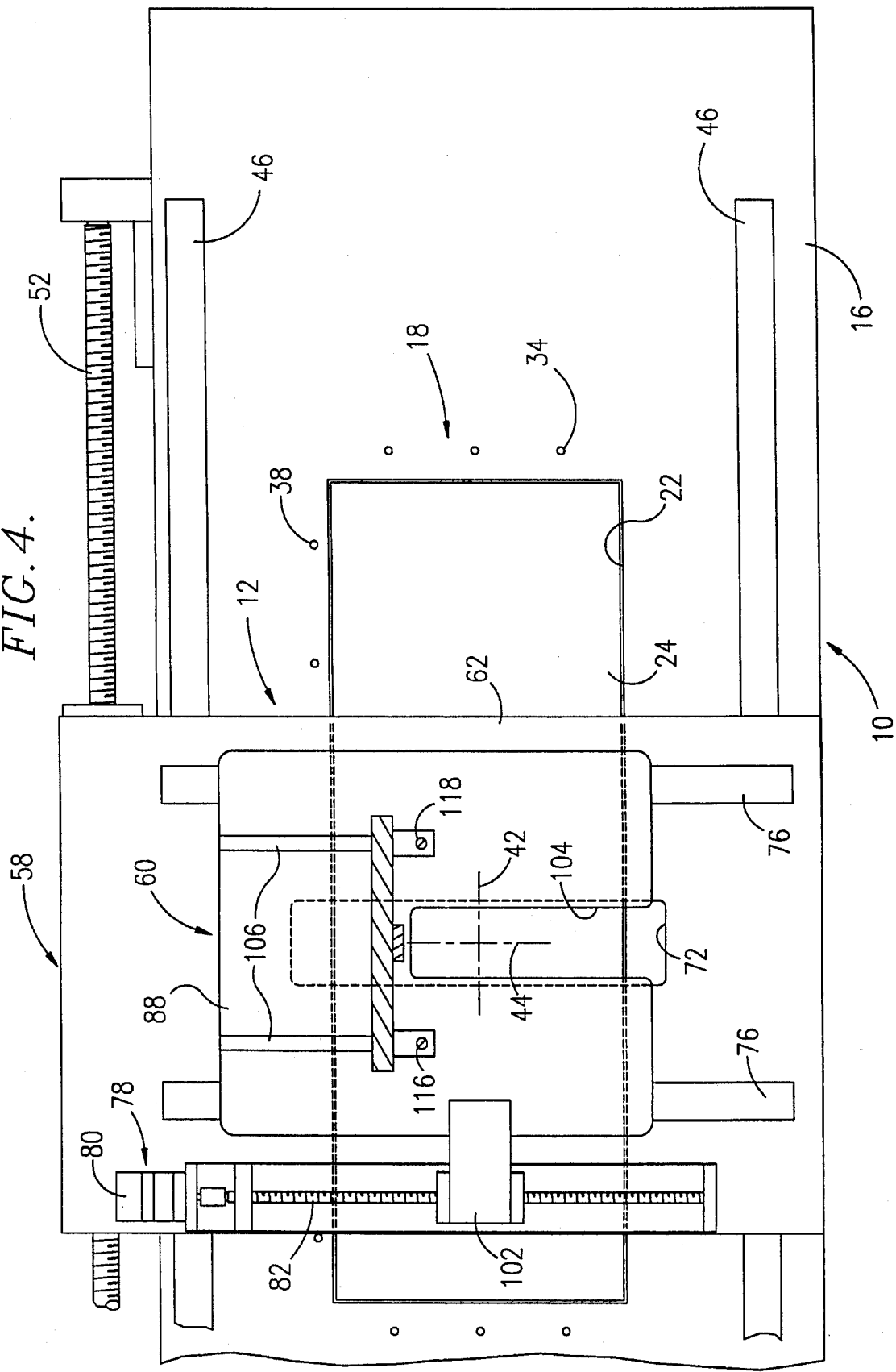
FIG. 4 is a sectional view along line 4—4 of FIG. 1, illustrating particular features of a carriage assembly of the apparatus.

The upper plate 62 of the base carriage is shown in FIG. 4, and includes a central slot 72 extending in a direction parallel to the Y axis beyond the front and rear edges of the plate 24 in the table top. As illustrated in FIG. 5, roller assemblies 74 are provided on the underside of the upper plate 62 in alignment with the X-axis guide rails 46 on the table top for supporting the base carriage on the rails for movement along the X axis.

Returning to FIG. 4, Y-axis guide rails 76 are mounted on the upper surface of the plate for accommodating the tower assembly 60 for movement in a direction parallel to the Y axis. A Y-axis drive means 78 is mounted on the base carriage 58 adjacent one of the guide rails 76 for moving the tower assembly 60 relative to the film image in either direction along the Y axis regardless of the position of the carriage assembly along the X axis. The Y-axis drive means 78 includes a servo or stepper motor 80 supported on the upper plate of the carriage, and a drive screw 82 connected to the output shaft of the motor and supported for rotation within suitable bearing assemblies. The screw extends in a direction parallel to the guide rails 76 and to the Y axis 44.

As shown in FIG. 6, the lower plate 64 of the base carriage 58 supports a lighting means for transilluminating a film image that is supported on the support surface and for projecting the image through the slot 72 in the base carriage. The lighting means includes an elongated lamp 84 extending in a direction parallel to the Y axis and positioned directly beneath the slot 72. The lamp is supported in a conventional pair of electrical sockets 86, and the intensity of the lamp may be adjusted by the control system in a known manner depending on the lighting needs for a particular scanning operation.

The tower assembly 60 is illustrated in FIG. 5, and includes a bottom plate 88, an upstanding vertical wall 90, a digitizing means 92 for sensing a linear analog image and converting the linear image into digital data, and an objective lens means 94 for focusing the projected analog image at the digitizing means. In addition, the tower assembly includes two separate drive means 96, 98 for moving the digitizing means and objective lens means relative to one another and to the film image in either direction along the Z axis.

The underside of the bottom plate 88 includes roller assemblies 100 aligned with the Y-axis guide rails 76 on the base carriage for supporting the tower assembly on the rails for movement along the Y axis. A follower 102 is attached to the bottom plate and extends between the tower assembly and the Y-axis drive screw 82. The follower includes a threaded collar that is fixed relative to the tower assembly so that when the Y-axis screw 82 is rotated by the motor 80, the tower assembly 60 is moved relative to the carriage 58 in a direction parallel to the Y axis.

As shown in FIG. 4, the bottom plate includes a central slot 104 aligned with the slot 72 in the base carriage and sized large enough to permit the image of a film on the support surface to be projected through the objective lens means 94. If desired, the bottom plate may be U-shaped, with the slot 104 extending inward from the front edge of the plate along the Y-axis. Gussets 106 are provided between the bottom plate and the upstanding wall for stabilizing the wall and the components supported thereon.

The upstanding wall is shown in FIG. 4, and includes a front surface disposed adjacent the rear end of the slot 104. A single guide rail 108 is attached to the front surface of the wall and extends from the bottom plate toward the upper free end of the wall as shown in FIG. 5. A small horizontally extending shelf 110 protrudes forward from the wall at a position just above the guide rail, and a pair of stepper or servo motors 112, 114 are supported on the shelf on either side of the guide rail 108.

The motor 112 includes an output shaft connected to a drive screw 116 supported for rotation in bearing assemblies positioned on one side of the guide rail, and defines the first Z-axis ($Z_1$) drive means 96 for moving the digitizing means 92. The motor 114 includes an output shaft connected to a drive screw 118 supported for rotation in bearing assemblies positioned on the other side of the rail 108, and defines the second Z-axis ($Z_2$) drive means 98 for moving the objective lens means 94.

The digitizing means 92 includes a digitizer of conventional construction, and preferably employs a charge coupled device (CCD) presenting a linear array of receptors. In an exemplary embodiment of the invention, the CCD array is 1⅜ inches long, presenting 5000 receptors each of which detects a pixel of about 7 micrometers in diameter. The CCD is designed for operation at a 40 megahertz rate and outputs information for each receptor in an 8-bit format that allows sensing of 256 gray levels.

The digitizer is housed with support electronics within a box, and is secured to a digitizer mount 120 that is illustrated in FIG. 8. The digitizer mount includes a plate having a central circular hole 122 through which the linear array 162 of the CCD is exposed, and a roller assembly 124 secured to the rear edge of the plate for engaging the guide rail 108 to guide movement of the mount in a direction parallel to the Z axis. A follower 126 is connected to the rear corner of the plate, and includes a fixed threaded collar that is received on the screw 116 so that when the screw is rotated, the mount 120 is moved vertically along the guide rail 108. The digitizer is supported on the mount in an orientation with the length of the linear array extending in a direction parallel to the Y-axis.

By employing a separate mount 120, shown in FIG. 8, for removably supporting the CCD on the apparatus, it is possible to change out the CCD with CCDs of different constructions, or with other types of digitizing means. Thus, the apparatus may be easily retrofitted with newly developed digitizing devices as such devices become available.

Figure 7:
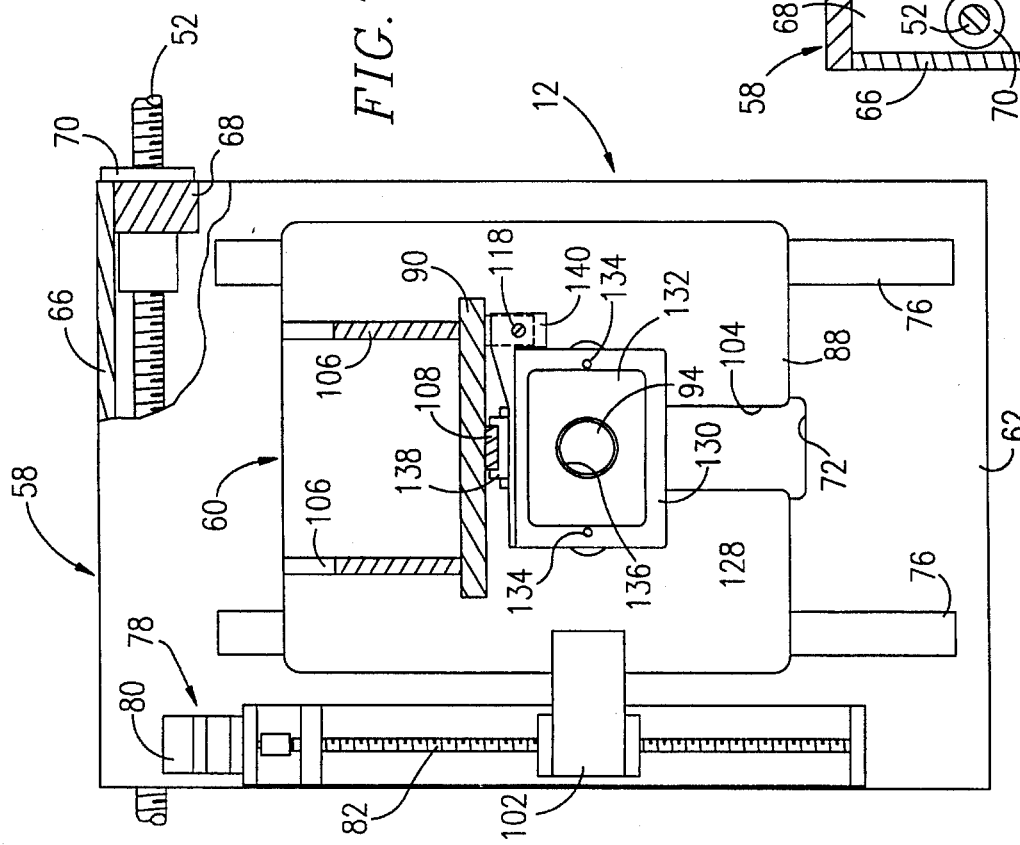
FIG. 7 is a sectional view along line 7—7 of FIG. 5, illustrating a lens mount and lens of the apparatus.

Returning to FIG. 5, the objective lens means 94 preferably includes an objective lens having a fixed focal length and an adjustable aperture. The lens 94 is mounted on a lens mount 128 that is illustrated in FIG. 7. The lens mount includes a hollow rectangular frame 130 and a plate 132 that is secured to the bottom of the frame by a pair of threaded fasteners 134 accessible from beneath the mount, as shown in FIG. 5. Returning to FIG. 7, the plate 132 includes a central opening 136 aligned with the hole 122 in the digitizer mount 120 (best shown in FIG. 8), and the lens 94 is supported within the opening 136. A roller assembly 138 is secured to the rear edge of the frame 130 for engaging the guide rail 108 to guide movement of the mount 128 along the Z axis and collinear with the direction of travel of the digitizer mount. A follower 140 is connected to the rear corner of the frame, and includes a fixed threaded collar that is received on the screw 118 so that when the screw is rotated, the mount is moved along the guide rail.

As shown in FIG. 6, a bellows 142 extends between and is connected to the digitizer mount 120 and the lens mount 128, and functions to provide a light-tight enclosure between the lens and the digitizer. An outer cover may also be provided on the tower assembly for protecting the components on the tower assembly and for providing additional protection against the intrusion of light into the digitizer.

The control system of the apparatus is illustrated in FIG. 12, and preferably includes a personal computer that is either stored beneath the table top on the apparatus or at a separate but adjacent location. The computer is represented by the dashed line 144, and includes all components common to such devices, including a motherboard on which a microprocessor 146 is mounted, an input keyboard and mouse, an SCSI interface for connection to external devices, both hard disk and floppy disk storage 148, a monitor or display 150, an SVGA board 115 for generating the desired graphics on the display, and an ISA bus 154 interconnecting these components. In addition, a data assembly and compression board 156 is included in the computer, along with a motion controller board 158 for controlling energization of the X, Y and Z motors 50, 80, 112, 114 in response to preprogrammed or manually entered instructions from the computer. By connecting the motors, the lamp, the vacuum source, and the digitizer together for control by the computer, it is possible to control the light intensity, exposure, pass length, pass width, pass speed and vacuum hold-down of the film, all based on user input or preprogrammed control instructions.

The computer is connected to the digitizer 92 by a cable extending physically between the digitizer and the data assembly and compression board of the computer. Operation of the digitizer is controlled through the assembly board, with digital data from the digitizer being received in the assembly board for processing before being displayed or stored.

A suitable power supply 160 is also shown in FIG. 12, for providing power to the digitizer. This supply also powers the computer 144, the monitor 150, the motors 50, 80, 112, 114, the lamp 84, and the vacuum source.

In order to digitally archive an existing large analog drawing of the type typically found in the records of an engineering firm or department, the drawing is first transferred to film in a conventional manner, such as by the use of the flow camera disclosed in U.S. Ser. No. 08/125,444, described above. During this process, a drawing as large as 42 inches by 8 feet may be reduced by a factor of about 4.6 to a film size of 10×24 inches, and the analog image is enhanced using conventional photographic techniques in order to remove any discoloration or artifacts, such as tape, introduced into the original drawing by aging and misuse, and to reduce any variance of line intensity to a common black and white denominator.

The film on which the image is captured is developed by any suitable process, and provides an excellent analog archive of the original image that is available for immediate scanning or for storage. In this manner, aging is arrested, and even if the film is not scanned immediately, it remains available for later use.

To digitize the film image, the film 30 is placed on the support surface of the glass plate 24, as shown in FIG. 11, and the cover sheet 32 is positioned across the plate over the film. The holes 36 in the cover sheet are fitted on the pins 34 of the table top so that the sheet covers the gap around the entire periphery of the plate, and the vacuum source is energized to remove air from beneath the cover sheet. This evacuation of the air from the gap or space surrounding the plate draws the cover sheet and film against the support surface and holds the film in place.

Before scanning the film and converting it into digital data, the operator must calculate the required degree of resolution of the scanner necessary to provide the desired level of clarity of the drawing when enlarged back to the size of the original. For example, if the original drawing was reduced 4× when transferred to film, and the desired level of clarity of any drawing generated from the digital data is 300 dpi at the original drawing size, which is preferred by the industry, then it is necessary to adjust the size of the image projected onto the digitizer to provide a resolution of at least 1200 dpi "at the negative" or 300 dpi "at the original". Preferably, several common magnification levels are preprogrammed into the computer so that it will often be possible for the operator to simply identify various parameters, with the computer then providing the necessary adjustment of the magnification or reduction achieved.

The magnification or reduction is physically accomplished by adjusting the positions of the digitizer 92 and lens 94 relative to the film image along the Z axis. Preferably, as shown in FIG. 5, the first and second Z-axis drive means 96, 98 move the digitizer and objective lens between a range of enlarging positions in which the objective lens is closer to the film image than to the digitizer, and a range of reducing positions in which the objective lens is further from the film image than from the digitizer. Thus, the film image may be selectively enlarged, reduced, or projected onto the digitizer at original size before being sensed and converted into digital data.

In the preferred embodiment, magnification and reduction of up to 5× or more may be obtained with one lens without modifying the construction. For example, using the film from the flow camera disclosed in U.S. Ser. No. 08/125,444 which may have a fixed focus of 4.6 diameters of reduction from the original size to the film image, and a CCD of the particular size described above, the apparatus is capable of attaining the following resolutions, indicated in pixels per inch:

| Scale of Projected Image to Film Size | Resolution at Film Size | Resolution at Original Size |
| --- | --- | --- |
| 4.6:1 (enlargement) | 782 | 170 |
| 1:1 (same size) | 3,600 | 782 |
| 1:4.6 (reduction) | 16,560 | 3,600 |

Optimum pixel resolution is considered to be 300 dpi "at the original" for engineering drawings. At this resolution, the digital data to be stored is minimal and good detail can be expected when reproductions are made. However, modifications may be made in the apparatus without departing from the invention.

Once the vertical positions of the digitizer and lens are determined, suitable control is generated by the computer and delivered to the motors 112,114. The motor 112 drives the screw 116 to move the digitizer to the desired position independently of the lens mount 128, which is moved by the motor 114. The bellows 142 is chosen of a length sufficient to accommodate the entire range of movement of the digitizer and lens mounts 120, 128 to prevent light from entering the CCD from outside the desired field of view.

The film image is usually scanned during three or more separate passes of the digitizer over the film along the X axis, with the tower assembly 60 positioned at a different position along the Y axis during each pass. As shown in FIG. 9, the tower assembly is positioned over the center of the film image during the initial pass (I) of the digitizer along the X axis so that the central region of the image is scanned.

Upon completion of the first pass of the carriage assembly, the tower assembly is moved relative to the base carriage 58 along the Y axis to either side of the first pass position (I) to a second position (II) so that as the carriage assembly is moved again along the X axis over the image, a second adjacent region of the image is scanned, wherein the second region overlaps the first region by a predetermined small distance. It is in this overlap in the digitized image that "stitching" of the passes or scans occurs. Finally, upon completion of the second pass, the tower assembly is again moved along the Y axis to a third position (III), and a third adjacent pass is made along the X axis. This pattern of movement of the digitizer is employed regardless of the size of the film being digitized or the degree of magnification or reduction. The first pass is always made down the center of the film to establish a baseline from which subsequent passes are measured.

When scanning various sizes of film, it is necessary to adjust the positions of the digitizer and lens along the Z axis to obtain the desired scale of enlargement or reduction, and to adjust the Y position of the tower assembly for each of the three passes so that each pass overlaps the adjacent pass by a predetermined amount regardless of the width of each pass. The Y-axis adjustments are thus dependent upon the positions of the digitizer and lens along the Z axis.

The three passes over the image along the X axis may be made in a wallpaper fashion, wherein the digitizer is activated only during movement in a first direction along the X axis so that after completion of each pass over the image, the carriage assembly must be returned to the opposite end of the hold-down assembly before the subsequent pass is made. Alternately, the passes may be made in a serpentine fashion, wherein the digitizer is activated during movement in either direction along the X axis so that after completion of the first pass, the Y axis adjustment of the tower assembly is made and the carriage assembly makes the second pass while moving back across the image in the opposite direction along the X axis. Thereafter, the third pass is made in the same direction as the first pass.

There may be occasions when more than three passes are required. An example would be an instance when the desired number of pixels per inch "at the original" exceeds the number which can be obtained in three passes. In that case there would be perhaps five or seven narrower passes, or even more, at greater magnification in order to enlarge the image size with respect to the length of the CCD array. The effect of that would be to increase the dots per inch in the data and "at the original."

The manner in which the digitizer is operated, and the way in which data from the digitizer is handled by the apparatus is shown in FIG. 12. As mentioned above, the output of the CCD includes 8 bits of data for each pixel, and provides 256 gray levels of information ranging between black and white. Although the invention is designed primarily for use with engineering drawings in a black and white format, it is noted that continuous tone black and white images may also be handled in a similar manner without departing from the central theme of the invention. Color could be handled with the substitution of a color trilinear CCD in place of the black and white CCD employed in the preferred embodiment.

The linear array of receptors 162, shown in FIG. 8, provided on the CCD outputs a set of data representative of a single line of the sensed film image, and a separate set of data is generated for each line of the image sensed by the CCD as the CCD is moved across the image at a controlled speed. Returning to FIG. 12, at the beginning of each pass of the carriage assembly across the film image, the computer automatically activates the CCD, which remains activated during the entire pass over the image and outputs sequential sets of data each representative of a different line of the image region scanned.

As the data is delivered from the CCD, it is buffered in the support electronics 164 provided with the CCD, and is then transferred to the data assembly and compression board 156. Another buffer is provided on the board 156, within which the data is stored until data from a complete pass over the image is obtained. As the CCD completes each pass across the image, the computer deactivates the CCD to terminate the receipt of further data, and the necessary X-axis and Y-axis adjustments of the tower assembly are made by control of the X-axis and Y-axis motors.

The data accumulated in the buffer on board 156 is held only until completion of each pass, and is then sent to the computer buffer memory, where it is held until all three passes of the digitizer are completed. The data from the three passes is then consolidated and loaded into storage. Thereafter, the complete image data set is pulled from storage for processing. The control system includes conventional software for carrying out a thresholding operation on the 8 bit pixel data to assign a simple 1 or 0 to each pixel based upon the gray scale information at the pixel and at the surrounding pixels. The thresholding operation may be deactivated if desired in order to permit the conversion and storage of continuous tone images by the apparatus as pure gray scale data, not binary.

After the thresholding process is complete, if used, the data is compressed using a conventional CCITT Group IV or CALS Group IV method, and is then archived in storage. Alternately, the image may be displayed on the monitor 150 by converting the image data to the resolution selected by the user, and delivering the data to the monitor via the graphics board 152. If the user then changes the magnification desired at the monitor, the data is drawn from display memory 152, converted to the desired magnification, and delivered to the monitor Preferably, the data representative of the three image regions scanned by the digitizer are registered with one another by identifying the first line of image data for each region, and aligning the first lines of the other regions with one another so that the remaining lines of data are registered. Because the images in the overlapping areas of the regions are identical, they disappear when the image is combined, and it is not necessary to eliminate any of the stored image data. An alternate approach to registering the image data from the three regions together is to employ conventional stitching methods which marry the regional data together into a single set of image data.

Although the invention has been described with reference to the preferred embodiment illustrated in the attached drawing figures, it is noted that substitutions may be made and equivalents employed herein without departing from the scope of the invention as recited in the claims.

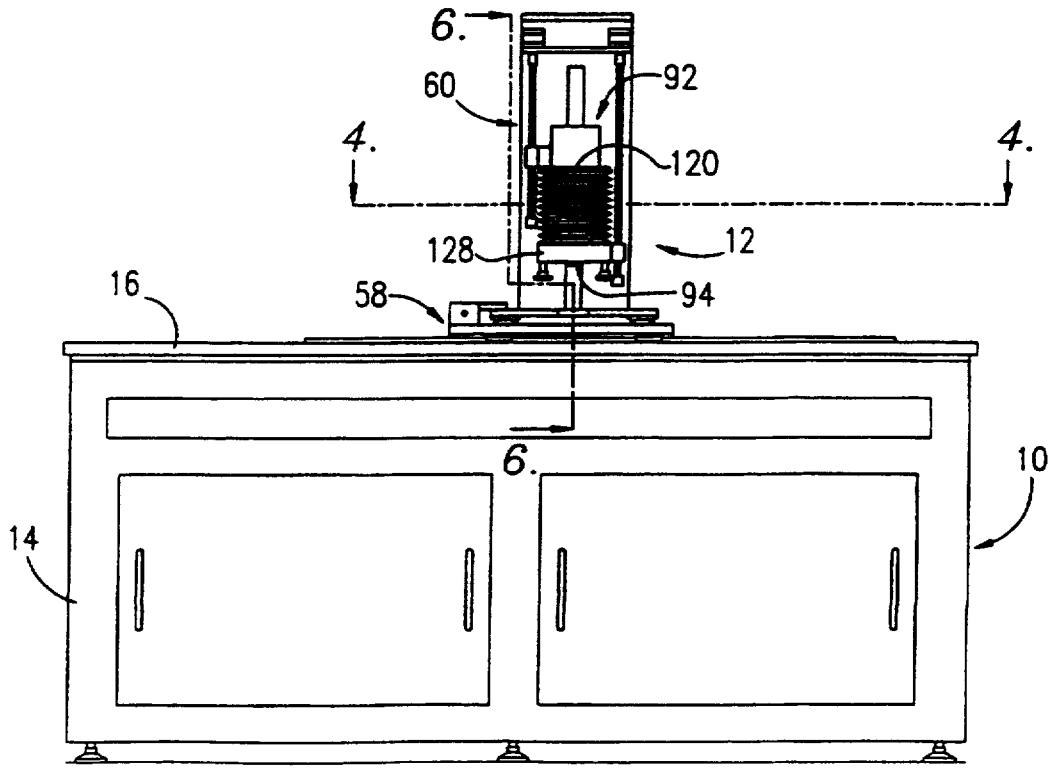

What is claimed is:

1. An apparatus for digitally archiving analog film images, the apparatus comprising:

a support means for supporting an analog film image within a plane defined by perpendicular X and Y axes;

a carriage supported for movement along the X axis relative to the support means;

an X-axis drive means for moving the carriage in either direction along the X axis;

a digitizing means spaced from the image in a direction defining a Z axis perpendicular to the X and Y axes for sensing a linear analog image and for converting the linear image into digital data representing an area format, the digitizing means being supported on the carriage above the film image with the length of the linear analog image sensed by the digitizing means extending in a direction parallel to the Y axis;

a lighting means mounted on the carriage beneath the support means for transilluminating the film image and projecting the image upward toward the digitizing means;

an objective lens means mounted on the carriage above the support means between the film image and the digitizing means for focusing the projected analog image at the digitizing means; and first and second Z-axis drive means mounted on the carriage for moving the digitizing means and objective lens means relative to one another and to the film image between a range of enlarging positions in which the objective lens means is closer to the film image than to the digitizing means, and a range of reducing positions in which the objective lens means is further from the film image than from the digitizing means so that the film image may be enlarged, reduced or projected at original size before being sensed and converted into digital data.

2. An apparatus as recited in claim 1, further comprising a tower assembly supported on the carriage for movement along the Y axis; and a Y-axis drive means for moving the tower assembly relative to the carriage in either direction along the Y axis, the digitizing means being supported on the tower assembly for movement along the Z axis.

3. An apparatus as recited in claim 2, further comprising a lens mount on which the objective lens means is mounted, a mounting means for supporting the digitizing means, and a single guide means on the tower assembly on which the mounting means and the lens mount are supported for movement along the Z axis relative to one another and to the film image.

4. An apparatus for digitally archiving analog images from film negatives and positives, the apparatus comprising:

a digitizing means for sensing a linear analog image and for converting the linear image into digital data;

a support means for supporting an analog film image within a plane defined by perpendicular X and Y axes, the film image being spaced from the digitizing means in a direction defining a Z axis perpendicular to the X and Y axes;

a lighting means for illuminating the film image and projecting the image toward the digitizing means;

an objective lens means for focusing the projected analog image at the digitizing means;

a mounting means for supporting the digitizing means relative to the film image such that the length of the linear analog image sensed by the digitizing means extends in a direction parallel to the Y axis;

an X-axis drive motor means for moving the mounting means relative to the film image in either direction alone the X axis so that the digitizing means sequentially senses and converts a plurality of linear images into digital data representing an area format;

a first Z-axis drive means for moving the digitizing means relative to the film image in either direction along the Z axis so that the size of the image projected onto the digitizing means can be varied;

a second Z-axis drive means for moving the objective lens means relative to both the film image and the digitizing means in either direction along the Z axis to permit the projected analog image to be focused at the digitizing means at any position of the mounting means along the Z axis; and a carriage supported for movement along the X axis relative to the support means, said carriage means having the digitizing means, lighting means, objective lens means, mounting means, and first and second Z-axis drive motor means mounted thereon.

5. An apparatus as recited in claim 4, further comprising a tower assembly supported on the carriage for movement along the Y axis, the mounting means being supported on the tower assembly for movement along the Z axis, wherein movement of the digitizing means along the X axis is achieved by moving the carriage relative to the support means, movement of the digitizing means along the Y axis is achieved by moving the tower assembly relative to the carriage, and movement of the digitizing means along the Z axis is achieved by moving the mounting means relative to the tower assembly.

6. An apparatus as recited in claim 5, further comprising a lens mount on which the objective lens means is mounted, and a single guide means on the tower assembly on which the mounting means and the lens mount are supported for movement along the Z axis relative to one another and to the film image.

7. An apparatus for digitally archiving analog images from film negatives and positives, the apparatus comprising;

a digitizing means for sensing a linear analog image and for converting the linear image into digital data;

a support means for supporting an analog film image within a plane defined by perpendicular X and Y axes, the film image being spaced from the digitizing means in a direction defining a Z axis perpendicular to the X and Y axes;

a lighting means for illuminating the film image and projecting the image toward the digitizing means;

an objective lens means for focusing the projected analog image at the digitizing means;

a mounting means for supporting the digitizing means relative to the film image such that the length of the linear analog image sensed by the digitizing means extends in a direction parallel to the Y axis;

a lens mount on which the objective lens means is mounted;

a single guide means on which the mounting means and the lens mount are supported for movement along the Z axis relative to one another and to the film image; and an X-axis drive motor means for moving the mounting means relative to the film image in either direction along the X axis so that the digitizing means sequentially senses and converts a plurality of linear images into digital data representing an area format;

a first Z-axis drive means for moving the digitizing means relative to the film image in either direction along the Z axis so that the size of the image projected onto the digitizing means can be varied; and a second Z-axis drive means for moving the objective lens means relative to both the film image and the digitizing means in either direction along the Z axis to permit the projected analog image to be focused at the digitizing means at any position of the mounting means along the Z axis.

8. An apparatus as recited in claim 7, wherein the first and second Z-axis drive motor means move the digitizing means and objective lens means between a range of enlarging positions in which the objective lens means is closer to the film image than to the digitizing means, and a range of reducing positions in which the objective lens means is further from the film image than from the digitizing means so that the film image may be either enlarged or reduced before being sensed and converted into digital data representing an area format.

9. An apparatus as recited in claim 7, wherein the digitizing means includes a charge coupled device (CCD) presenting a linear array of light sensitive elements.

10. An apparatus as recited in claim 7, wherein the digitizing means is removable from the mounting means for enabling substitution of one digitizing means for another.

11. An apparatus as recited in claim 7, further comprising a Y-axis drive motor means for moving the mounting means relative to the film image in either direction along the Y axis.

12. An apparatus for digitally archiving at least two analog film images, the apparatus comprising:

a support means for sequentially supporting at least two congruently related analog film images parallel to a plane defined by perpendicular X and Y axes;

a digitizing means mounted above the support means for sensing a linear analog image and for converting the linear image into digital data, the digitizing means being spaced from the support means in a direction defining a Z axis perpendicular to the X and Y axes;

a lighting means mounted beneath the support means for transilluminating the film images and projecting the images toward the digitizing means;

an objective lens means mounted above the support means between the support means and the digitizing means for focusing the projected analog images at the digitizing means; and first and second Z-axis drive means for moving the digitizing means and objective lens means relative to one another and to the film image between a range of enlarging positions in which the objective lens means is closer to the film image than to the digitizing means, and a range of reducing positions in which the objective lens means is further from the film image than from the digitizing means, wherein the film image may be enlarged, reduced or projected at original size before being sensed and converted into digital data, the support means including a transparent support surface defining the plane, a plurality of registration pins positioned adjacent at least one side of the support surface, and a separate transparent support substrate for supporting each film image, each support substrate including a plurality of holes aligned with the registration pins so that the film images may be registered relative to one another sequentially on the support surface when the support substrates are each positioned on the registration pins one after the other.

13. An apparatus for digitally archiving analog film images, the apparatus comprising:

a support means for supporting an analog film image within a plane defined by perpendicular X and Y axes;

an X-axis carriage supported for movement along the X axis relative to the support means;

an X-axis drive means for moving the carriage in either direction along the X axis;

a digitizing means spaced above the image in a direction defining a Z axis perpendicular to the X and Y axes for sensing a linear analog image and for converting the linear image into digital area raster data, the digitizing means being supported on the carriage with the length of the linear analog image sensed by the digitizing means extending in a direction parallel to the Y axis;

a lighting means mounted on the carriage beneath the support means for transilluminating the film image and projecting the image upward toward the digitizing means;

an objective lens means mounted on the X-axis carriage above the support means between the image and the digitizing means for focusing the projected analog image at the digitizing means;

a first Z-axis drive means mounted on the carriage for moving the digitizing means relative to the film image in either direction along the Z axis so that the size of the image projected onto the digitizing means can be varied; and a second Z-axis drive means mounted on the carriage for moving the objective lens means relative to both the film image and the digitizing means in either direction along the Z axis to permit the projected analog image to be focused at the digitizing means at any position of the digitizing means along the Z axis.

14. An apparatus for digitally archiving analog film images, the apparatus comprising:

a digitizing means for sensing a linear analog image and for converting the linear image into digital data, the digitizing means including a linear array of sensing elements;

a support means for supporting an analog film image within a plane defined by perpendicular X and Y-axes, the plane being spaced from the digitizing means in a direction defining a Z axis perpendicular to the X and Y axes a lighting means for transilluminating the film image and projecting the image toward the digitizing means;

an objective lens means for focusing the projected analog image at the digitizing means;

a mounting means for supporting the digitizing means relative to the film image with the linear array of sensing elements extending along the Y axis;

an X-axis drive means for moving the mounting means relative to the film image in either direction along the X axis;

a Y-axis drive means for positioning the mounting means along the Y axis relative to the film image so that as the digitizing means is moved across the image along the X axis, a first region of the image is sensed and converted into digital data, the Y-axis drive means being selectively operable to reposition the mounting means along the Y axis so that as the digitizing means is subsequently moved again across the image along the X axis, different adjacent regions of the image are sequentially sensed and converted into digital data;

a first Z-axis drive means for moving the mounting means relative to the film image in either direction along the Z axis so that the size of the image projected onto the digitizing means can be varied; and a control means for controlling the operation of the Y-axis drive means based or the position of the mounting means relative to the support means along the Z axis so that first, second, and subsequent regions of the image sensed and converted by the digitizing means overlap one another by a predetermined distance.

15. An apparatus for digitally archiving analog film images, the apparatus comprising:

a digitizing means for sensing a linear analog image and for converting the linear image into digital data, the digitizing means including a linear array of sensing elements;

a support means for supporting an analog film image within a plane defined by perpendicular X and Y axes, the plane being spaced from the digitizing means in a direction defining a Z axis perpendicular to the X and Y axes;

a lighting means for transilluminating the film image and protecting the image toward the digitizing means;

an objective lens means for focusing the projected analog image at the digitizing means;

a mounting means for supporting the digitizing means relative to the film image with the linear array of sensing elements extending along the Y axis;

an X-axis drive means for moving the mounting means relative to the film image in either direction along the X axis;

a Y-axis drive means for positioning the mounting means along the Y axis relative to the film image so that as the digitizing means is moved across the image along the X axis, a first region of the image is sensed and converted into digital data, the Y-axis drive means being selectively operable to reposition the mounting means along the Y axis so that as the digitizing means is subsequently moved again across the image along the X axis, different adjacent regions of the image are sequentially sensed and converted into digital data;

a first Z-axis drive means for moving the mounting means relative to the film image in either direction along the Z axis so that the size of the image projected onto the digitizing means can be varied; and a control means for activating the digitizing means only during movement of the mounting means in a first direction along the X axis so that the digitizing means follows a serpentine pattern in sensing and converting the first and second regions of the image, wherein the digitizing means senses and converts each region during movement in the same direction along the X axis.

16. An apparatus for digitally archiving analog film images, the apparatus comprising:

a digitizing means for sensing a linear analog image and for converting the linear image into digital data, the digitizing means including a linear array of sensing elements;

a support means for supporting an analog film image within a plane defined by perpendicular X and Y axes, the plane being spaced from the digitizing means in a direction defining a Z axis perpendicular to the X and Y axes;

a lighting means for transilluminating the film image and projecting the image toward the digitizing means;

an objective lens means for focusing the projected analog image at the digitizing means;

a mounting means for supporting the digitizing means relative to the film image with the linear array of sensing elements extending along the Y axis;

an X-axis drive means for moving the mounting means relative to the film image in either direction along the X axis;

a Y-axis drive means for positioning the mounting means along the Y axis relative to the film image so that as the digitizing means is moved across the image along the X axis, a first region of the image is sensed and converted into digital data, the Y-axis drive means being selectively operable to reposition the mounting means along the Y axis so that as the digitizing means is subsequently moved again across the image along the X axis, different adjacent regions of the image are sequentially sensed and converted into digital data;

a first Z-axis drive means for moving the mounting means relative to the film image in either direction along the Z axis so that the size of the image projected onto the digitizing means can be varied; and a control means for activating the digitizing means during movement of the mounting means in either direction along the X axis so that the digitizing means follows a serpentine pattern in sensing and converting the first and second regions of the image, wherein the digitizing means senses and converts the first region during movement in one direction along the X axis and the second region during movement in the opposite direction along the X axis.

* * * * *

UNITED STATES PATENT AND TRADEMARK OFFICE
CERTIFICATE OF CORRECTION

PATENT NO. : 5,574,577
DATED : Nov. 12, 1996
INVENTOR(S) : Joseph H. Wally, et al.

It is certified that error appears in the above-indentified patent and that said Letters Patent is hereby corrected as shown below:

The title page should be deleted to appear as per attached.

Signed and Sealed this

Eighteenth Day of March, 1997

Attest:

BRUCE LEHMAN

*Attesting Officer*  *Commissioner of Patents and Trademarks*

United States Patent

Wally, Jr. et al.

[11] Patent Number: 5,574,577
[45] Date of Patent: Nov. 12, 1996

[54] METHOD AND APPARATUS FOR DIGITALLY ARCHIVING ANALOG IMAGES

[75] Inventors: Joseph H. Wally, Jr., Overland Park; John G. Voeller, Lenexa, both of Kans.

[73] Assignee: Black & Veatch Architects, Inc., Kansas City, Mo.

[21] Appl. No.: 225,656

[22] Filed: Apr. 11, 1994

[51] Int. Cl.$^6$ .............. H04N 1/00; H04N 1/04; H04N 9/47; G03B 27/00
[52] U.S. Cl. .............. 358/487; 358/403; 355/18; 355/55; 348/108; 348/112; 356/444
[58] Field of Search .............. 358/487, 403; 355/18, 55; 348/112, 108, 79, 96; 250/570, 363.02; 356/404, 444; 382/128; 364/413.13; 378/12, 62, 146, 210, 4, 20, 181; 346/101, 108, 122

[56] References Cited

U.S. PATENT DOCUMENTS

| | | | |
|---|---|---|---|
| D. 338,903 | 8/1993 | Iimura | D16/225 |
| T945,006 | 4/1976 | Speck et al. | 348/79 |
| 4,032,784 | 6/1977 | Rich | 378/108 |
| 4,045,772 | 8/1977 | Bouton et al. | 348/79 |
| 4,574,318 | 3/1986 | Dayton et al. | 358/483 |
| 4,757,374 | 7/1988 | Ramsay et al. | 355/40 |
| 4,789,880 | 12/1988 | Mori et al. | 355/55 |
| 4,807,041 | 2/1989 | Kishi et al. | 348/112 |
| 4,910,601 | 3/1990 | Gerlach | 358/474 |
| 5,153,638 | 10/1992 | Sakakibara | 355/55 |
| 5,241,472 | 8/1993 | Gur et al. | 364/413.13 |
| 5,331,435 | 7/1994 | Scott | 358/479 |

*Primary Examiner*—Kim Yen Vu
*Assistant Examiner*—Kimberly A. Williams
*Attorney, Agent, or Firm*—Hovey, Williams, Timmons & Collins

[57] ABSTRACT

An apparatus for digitally archiving analog film images includes a support surface on which an analog film image may be supported, and a digitizer that is spaced from the support surface in a direction defining a Z axis perpendicular to the support surface. A light transilluminates the film image and projects it toward the digitizer through an objective lens which focuses the image. The positions of the digitizer and the lens along the Z axis are adjustable so that the size of the image projected onto the digitizing means can be varied. For example, it is possible to move the digitizer and objective lens between a range of enlarging positions in which the lens is closer to the film image than to the digitizer, and a range of reducing positions in which the lens is further from the film image than from the digitizer so that the film image may be either enlarged, reduced or reproduced at the same size before being sensed and converted into digital data.

16 Claims, 6 Drawing Sheets